US012783566B2

(12) United States Patent
Dong et al.

(10) Patent No.: US 12,783,566 B2
(45) Date of Patent: Nov. 3, 2026

(54) BINARY QUANTIZATION IN VECTOR DATABASES

(71) Applicant: SAP SE, Walldorf (DE)

(72) Inventors: Zhi-peng Dong, Xi'an (CN); Jing He, Xi'an (CN); Jiao Zhou, Xi'an (CN)

(73) Assignee: SAP SE, Walldorf (DE)

( * ) Notice: Subject to any disclaimer, the term of this patent is extended or adjusted under 35 U.S.C. 154(b) by 133 days.

(21) Appl. No.: 18/973,198

(22) Filed: Dec. 9, 2024

(65) Prior Publication Data

US 2026/0161689 A1 Jun. 11, 2026

(51) Int. Cl.

| | |
|---|---|
| ***G06F 40/00*** | (2020.01) |
| ***G06F 16/242*** | (2019.01) |
| ***G06F 16/334*** | (2025.01) |

(52) U.S. Cl.

CPC ...... *G06F 16/3344* (2019.01); *G06F 16/2438* (2019.01)

(58) Field of Classification Search

CPC ............... G06F 40/30; G06F 16/24542; G06F 16/3329; G06F 40/279; G06F 16/215; G06F 16/243; G06F 16/288; G06F 16/3328; G06F 16/35; G06F 40/20; G06F 40/284; G06F 40/289; G06F 40/295; G06N 3/0455; G06N 3/0464; G06N 3/0442; G06N 3/044; G06N 3/047; G06N 3/0475; G06N 3/048; G06N 3/0495; G06N 3/088; G06N 3/0895; G06N 3/09; G06N 3/091; G06N 3/092; G06N 3/094; G06N 3/096; G06N 5/04; G06N 5/045; G06N 5/043

See application file for complete search history.

(56) References Cited

U.S. PATENT DOCUMENTS

| | | | | |
|---|---|---|---|---|
| 12,182,125 | B1 * | 12/2024 | Buniatyan ........... | G06F 11/3409 |
| 2023/0222325 | A1 * | 7/2023 | Wang ..................... | G06N 3/082 706/15 |
| 2024/0281644 | A1 * | 8/2024 | Su .......................... | G06N 3/063 |
| 2025/0238629 | A1 * | 7/2025 | Malkiel ................ | G06F 40/194 |

OTHER PUBLICATIONS

Li, Shiwei, et al. "Mixed-precision embeddings for large-scale recommendation models." arXiv preprint arXiv:2409.20305 (2024). (Year: 2024).*

Gan, Yukang, et al. "Binary embedding-based retrieval at Tencent." Proceedings of the 29th ACM SIGKDD Conference on Knowledge Discovery and Data Mining. 2023. (Year: 2023).*

* cited by examiner

*Primary Examiner* — Edgar X Guerra-Erazo

(74) *Attorney, Agent, or Firm* — Fish & Richardson P.C.

(57) ABSTRACT

Methods, systems, and computer-readable storage media for generating a set of data embeddings from context data, each data embedding including N-dimensions and representing context data within a first embedding space, determining, for each dimension of the N-dimensions, a set of statistics, providing a set of thresholds, each threshold in the set of thresholds corresponding to a dimension of the N-dimensions and being determined based on a respective set of statistics for the dimension, generating a set of binary embeddings through binary quantization of data embeddings in the set of data embeddings using the set of thresholds, each binary embedding including the N-dimensions and representing context data in the set of context data within a second embedding space, retrieving a sub-set of context data responsive to a query based on the set of binary embeddings, and prompting a LLM using a prompt comprising the sub-set of context data.

20 Claims, 8 Drawing Sheets

300

300

BINARY QUANTIZATION IN VECTOR DATABASES

BACKGROUND

Enterprises continuously seek to improve and gain efficiencies in their operations. To this end, enterprises employ software systems to support execution of operations. Enterprises integrate systems in the domain of so-called intelligent enterprise, which can employ artificial intelligence (AI) that can include, for example, machine learning (ML) models. For example, AI can be used for data analytics and/or automating tasks in support of enterprise operations. In the field of AI, so-called generative AI (GAI) has recently seen an explosion in popularity. GAI can be described as including so-called foundation models that generate content based on training data. For example, foundation models can include large language models (LLMs), which are a form of GAI that can be used to generate text for a variety of use cases.

As intelligent enterprise evolves, enterprises look to leverage the power of GAL. This can include integrating GAI to support execution of tasks of workflows in support of operations of an enterprise. However, integrating GAI into enterprise platforms is a non-trivial task. For example, GAI can present various technical challenges and can have disadvantages that have to be managed.

SUMMARY

Implementations of the present disclosure are directed to binary quantization for vector engines. More particularly, implementations of the present disclosure are directed to binary quantization in generating vectors using vector engines to support domain-specific prompting of large language models (LLMs).

In some implementations, actions include generating a set of data embeddings from a set of context data, each data embedding including N-dimensions and representing context data in the set of context data within a first embedding space, determining, for each dimension of the N-dimensions, a set of statistics, providing a set of thresholds, each threshold in the set of thresholds corresponding to a dimension of the N-dimensions and being determined based on a respective set of statistics for the dimension, generating a set of binary embeddings through binary quantization of data embeddings in the set of data embeddings using the set of thresholds, each binary embedding including the N-dimensions and representing context data in the set of context data within a second embedding space, retrieving a sub-set of context data responsive to a query based on the set of binary embeddings, and prompting a LLM using a prompt comprising the sub-set of context data. Other implementations of this aspect include corresponding systems, apparatus, and computer programs, configured to perform the actions of the methods, encoded on computer storage devices.

These and other implementations can each optionally include one or more of the following features: each threshold in the set of thresholds includes an initial threshold and a bias that are each specific to a respective dimension of the N-dimensions; the set of statistics includes, for each dimension, a mean, a median, and a mid; retrieving a sub-set of context data responsive to a query based on the set of binary embeddings includes generating a query embedding representative of the query in the first embedding space, generating a query binary embedding representative of the query in the second embedding space using the set of thresholds, determining a set of candidate binary embeddings by comparing the query binary embedding to binary embeddings in the set of binary embeddings, retrieving a first sub-set of data embeddings from the vector database based on the set of candidate binary embeddings, determining a second sub-set of data embeddings by comparing the query embedding to data embeddings in the first sub-set of data embeddings, and retrieving context data corresponding to data embeddings in the second sub-set of data embeddings; the first embedding space includes floating point values and the second embedding space includes binary values; each threshold in the set of thresholds is specific to a dimension of the N-dimensions; the set of statistics is determined based on normalizing values of a respective dimension of the N-dimensions.

The present disclosure also provides one or more computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and one or more computer-readable storage media coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
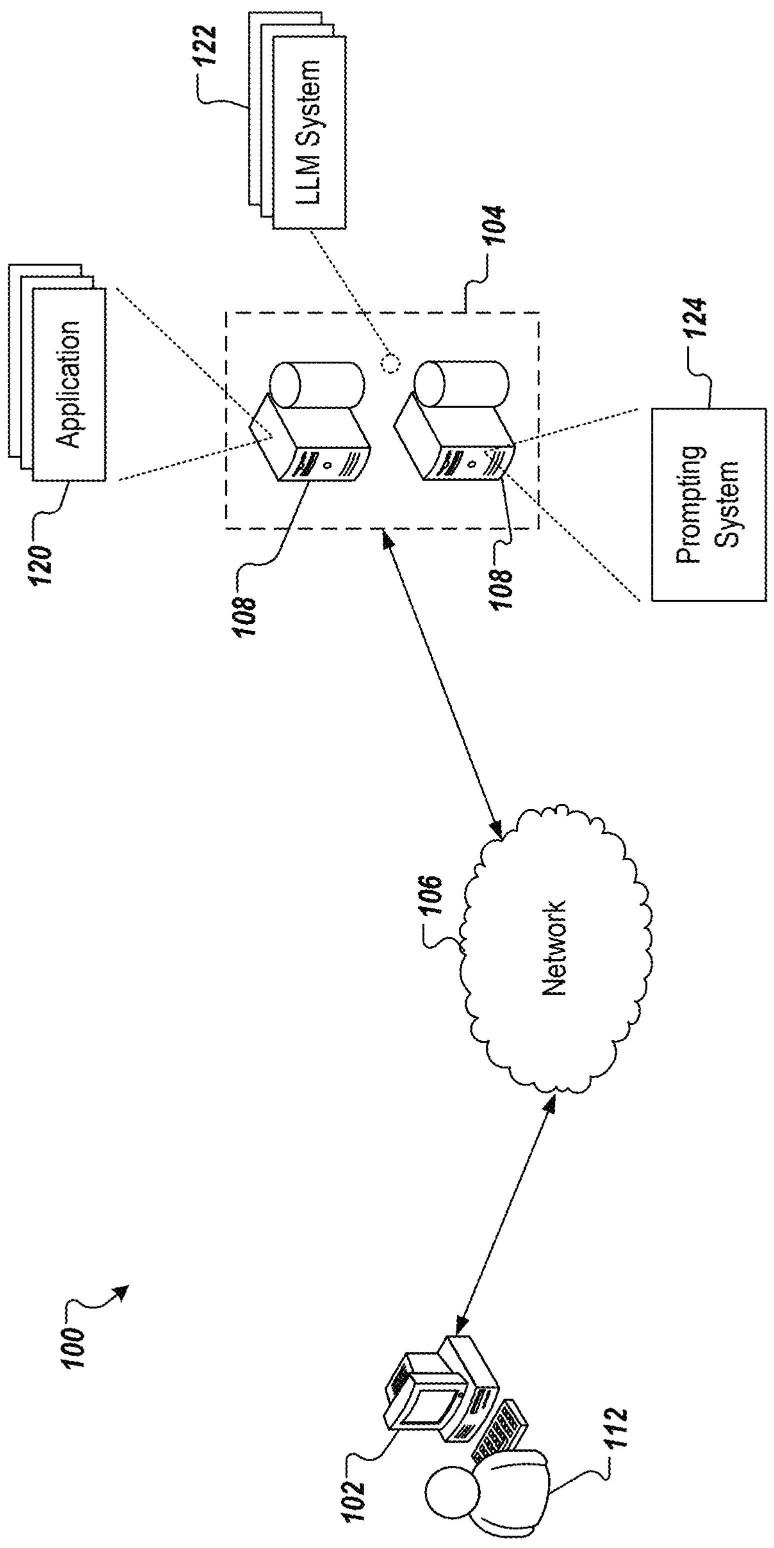
FIG. 1 depicts an example architecture that can be used to execute implementations of the present disclosure.

Implementations of the present disclosure are directed to binary quantization for vector engines. More particularly, implementations of the present disclosure are directed to binary quantization in generating vectors using vector engines to support domain-specific prompting of large language models (LLMs). Implementations can include actions of generating a set of data embeddings from a set of context data, each data embedding including N-dimensions and representing context data in the set of context data within a first embedding space, determining, for each dimension of the N-dimensions, a set of statistics, providing a set of thresholds, each threshold in the set of thresholds corresponding to a dimension of the N-dimensions and being determined based on a respective set of statistics for the dimension, generating a set of binary embeddings through binary quantization of data embeddings in the set of data embeddings using the set of thresholds, each binary embedding including the N-dimensions and representing context data in the set of context data within a second embedding space, retrieving a sub-set of context data responsive to a query based on the set of binary embeddings, and prompting a LLM using a prompt comprising the sub-set of context data.

To provide further context for implementations of the present disclosure, and as introduced above, enterprises look to leverage the power of generative artificial intelligence (GAI) by integrating, for example, use of LLMs in tasks of workflows that are executed in support of operations. However, integrating LLMs into workflows executed across enterprise platforms is a non-trivial task. For example, LLMs present various technical challenges and can have disadvantages that have to be managed, such technical challenges and disadvantages not existing in the pre-LLM world.

In further detail, using a LLM in the context of an application can be relatively complex. For example, this can include tasks that are more than just using a LLM-based chatbot to ask questions to and receive answers. In many cases, the result coming from the LLM needs to be integrated with other application data and the input prompt can be filled in by the application itself, instead of coming from the LLM model. For example, an example task can include resolving errors that arise in execution of an application. Each error can be unique and be resolved in a specific way for a respective tasks. As such, the response from the LLM should be in the domain of and account for specificities of the task at hand.

Getting high-quality and reliable responses from a LLM depends on various factors that are specific to the context of each task. This can include, for example, generating prompts (the input to the LLM), retrieving and integrating appropriate context data into prompts, and accessing services for prompting the LLM. Accordingly, each use case that leverages a LLM is unique, where specific problems need specific prompts, prompt templates, context data, and the like. For example, LLMs are generally trained and are not specific to any particular task or domain. As such, the effectiveness of an LLM in providing a response that is even relevant to a specific task is predominantly reliant on the prompt.

One approach to improving prompts to LLMs includes incorporating context data into prompts for zero-shot fine-tuning of the LLM in responding to the prompt. One approach to this is referred to as retrieval-augmented generation (RAG), which can be used to add reference knowledge, also referred to as context data, to prompts sent to LLMs. To this end, a vector database can be queried for context data to be included in prompt to the LLM. The vector database stores context data (e.g., text, chunks, documents) that is indexed to data embeddings representative of the context data. For example, context data can include a chunk, which is a portion of a document. The chunk can be processed by an embedder to embed the chunk in an embedding space. More particularly, the embedder generates a data embedding provided as a multi-dimensional vector that is representative of the chunk. Each dimension of the data embedding is a floating point number (e.g., 32-bit).

In adding context data to a prompt, a query embedding is provided by embedding a query in the same embedding space as the data embeddings. The query embedding is used to select a set of data embeddings and, for each data embedding, underlying context data (e.g., chunk, document) is returned and can be added to the prompt. More particularly, the vector database uses similarity search to identify data embeddings that reside in close proximity to the query embedding. However, executing similarity searches over multi-dimensional embeddings (vectors) where each dimensional is represented as a floating point number (e.g., FLOAT-32) incurs significant computational cost in terms of technical resources (e.g., processing, memory) that are consumed in addition to time required to execute the similarity search.

To enhance similarity searching, binary quantization has been introduced and can be described as using a binarization function to convert an embedding (vector of floating point numbers) into a binary embedding, which is a vector of binary values (e.g., each dimension being 0 or 1). In short, binary quantization reduces each feature of a given embedding (vector) into a binary digit. In some examples, binary quantization is performed by comparing the value (e.g., FLOAT-32 value) to a threshold and, if the value is greater than the threshold it is replaced with a first binary value (e.g., 1) and, if the value is less than or equal to the threshold it is replaced with a second binary value (e.g., 1).

Binary quantization provides computational and time efficiencies in retrieving context data from vector databases. As such, binary quantization balances resource consumption and speed with a trade-off in accuracy. For example, in comparing binary embeddings, a distance between the binary embeddings can be calculated as a Hamming distance. The lower the Hamming distance, the closer the binary embeddings. An advantage is that the Hamming distance can be resource-efficiently calculated within two CPU cycles on modern hardware, for example, resulting in comparatively fast retrieval.

However, the effectiveness of binary quantization can be significantly affected by data distribution, particularly data skew and symmetry. As a result, binary quantization can be inaccurate in many scenarios, which can obviate efficiencies in consumption of technical resources and speed that are expected.

In view of the above context, implementations of the present disclosure provide a vector database that uses a modified binary quantization for indexing data embeddings that are stored in the vector database. More particularly, and as described in further detail herein, for each feature (dimension) of an embedding, a feature-specific biased threshold is determined based on data skew and data symmetry represented across the data embeddings. A binary embedding is generated for each data embedding stored in the vector database to provide a set of binary embeddings that are used to index the data embeddings. In generating a binary embedding, a value of a feature (e.g., FLOAT-32 value) is compared to the feature-specific biased threshold determined for the respective feature to determine whether to assign a 0 or 1 for the feature in the binary embedding. In this manner, binary quantization of the present disclosure overcomes deficiencies of traditional approaches to binary quantization to improve accuracy and gain efficiencies in terms of technical resources and time.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, the server system 104 can host one or more applications 120 that execute tasks (e.g., as part of workflows) in support of enterprise operations. One or more tasks can arise in each of the applications 120, which is to be addressed. In handling a task, the applications 120 can leverage one or more GAI models, such as LLMs provisioned within LLM systems 122 hosted within the server system 104. Example LLMs can include, but are not limited to, Gemini-1.0-pro, gemini-1.5-flash, gemini-1.5-pro, gpt-35-turbo, gpt-35-turbo-16k, gpt-4, gpt-4-32k, gpt-4o, mistralai--mixtral-8x7b-instruct-v01, meta--llama3-70b-instruct, meta--llama3.1-70b-instruct, anthropic--claude-3-sonnet, anthropic--claude-3-haiku, anthropic--claude-3-opus, anthropic--claude-3.5-sonnet, amazon--titan-embed-text, amazon--titan-text-lite, amazon--titan-text-express, text-embedding-ada-002, text-embedding-3-small, text-embedding-3-large, text-bison, chat-bison, textembedding-gecko, and textembedding-gecko-multilingual.

For example, the application 120 can seek to query (prompt) a LLM of a LLM system 122 for a response that can be used to resolve the task. In accordance with implementations of the present disclosure, a prompting system 124 is provided that generates prompts to the LLM based on a query from the application 120, the prompting system 124 including a vector database for selecting context data to be included in the prompt. As described in further detail herein, the vector database indexes data embeddings using the modified binary quantization of the present disclosure to enable accurate and computationally-efficient identification and retrieval of context data.

Figure 2:
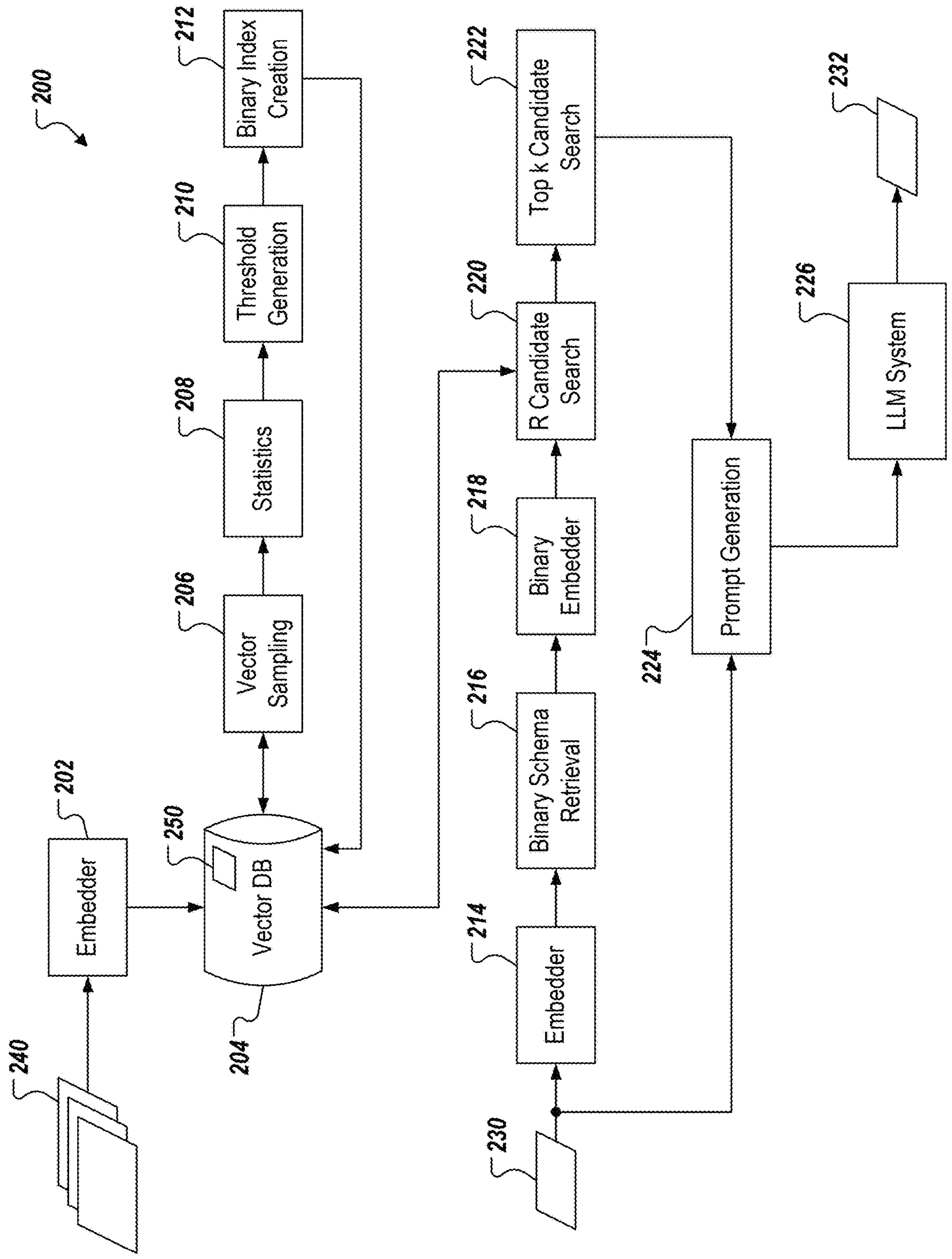
FIG. 2 depicts an example architecture that can be used to execute implementations of the present disclosure.

FIG. 2 depicts an example conceptual architecture 200 in accordance with implementations of the present disclosure. In the depicted example, the example conceptual architecture 200 includes an embedder 202, a vector database 232, a vector sampling module 206, a statistics module 208, a threshold generation module 210, a binary index creation module 212, an embedder 214, a binary schema retrieval module 216, a binary embedder 218, an R candidate search module 220, a top k candidate search module 222, a prompt generation module 224, and a LLM system 226. As described in further detail herein, a query 230 is processed to provide a prompt using the modified binary quantization of the present disclosure, the prompt being used to prompt a LLM of the LLM system 226, which returns a response 232.

In further detail, a set of context data 240 represents contextual information for a specific domain and one or more tasks that are relevant to the domain. In some examples, context data in the set of context data 240 can include, but is not limited to, text strings, documents, chunks of documents, and the like that are each representative of the domain and one or more tasks within the domain. An example domain can include, without limitation, resolving errors arising in applications (e.g., enterprise applications). For example, the query 230 can be descriptive of an error that has occurred in an application and can be used to prompt the LLM of the LLM system 226 to provide a resolution to the error, which is provided in the response 232. In construction of the prompt, context data from the set of context data 240 can be provided with the prompt to provide the LLM is domain- and task-specific context for the response 232.

In some implementations, each context data in the set of context data 240 is processed by the embedder 202, which embeds the context data in an embedding space. Here, for each context data in the set of context data 240, a data embedding (vector) is provided and is stored in the vector database 204. In some examples, the context data (or a link to the context data) for each data embedding is stored in the vector database 204 and is indexed to a respective data embedding ($E_{DATA}$). For example, the following example vector index can be provided:

TABLE 1

Example Vector Index

| Vector ID | Data Embedding | Context Data |
|---|---|---|
| 1 | $E_{DATA,\,1}$ | $URL_1$ |
| 2 | $E_{DATA,\,2}$ | $URL_2$ |
| . . . | . . . | . . . |
| N | $E_{DATA,\,N}$ | $URL_N$ |

Here, each vector ID is an identifier that uniquely identifies a respective data embedding ($E_{DATA}$), and each URL is a uniform resource locator that provides a link to context data represented by a respective data embedding ($E_{DATA}$). Each data embedding ($E_{DATA}$) is a multi-dimensional vector representation of a respective context data, wherein each feature (dimension) is assigned a floating point value (e.g., FLOAT-32 value). In some examples, the vector index table (e.g., Table 1) can be stored in a vector index maintained within the vector database 204.

As described in further detail herein, a binary embedding is provided for each data embedding stored within the vector database 204. More particularly, the modified binary quantization of the present disclosure is used to generate a binary embedding for each data embedding based on data skew and data symmetry represented within the values of features across the data embeddings. In some examples, a binary index 250 is built and is maintained within the vector database 204. An example binary index can be provided as:

TABLE 2

| Example Binary Index | |
|---|---|
| Vector ID | Binary Embedding |
| 1 | $E_{BIN,1}$ |
| 2 | $E_{BIN,2}$ |
| . . . | . . . |
| M | $E_{BIN,M}$ |

In generating the binary embeddings, multiple thresholds are used to convert floating point values of respective dimensions to binary values. For example, the following relationship can be provided:

$$f(x_i) = \begin{cases} 0, & \text{if } x_i \le T_i \\ 1, & \text{if } x_i \le T_i \end{cases} \quad (1)$$

where $x_i$ is the $i^{th}$ feature (dimension) of the data embeddings, and $T_i$ is the threshold to be applied for $x_i$. For example, for N-dimensional data embeddings, each data embedding includes feature values $\{x_1, \ldots, x_N\}$ with respective thresholds $\{T_1, \ldots, T_N\}$. As described in further detail herein, the use of respective thresholds accounts to data skew and data symmetry across values of the data embeddings.

Figure 3A:
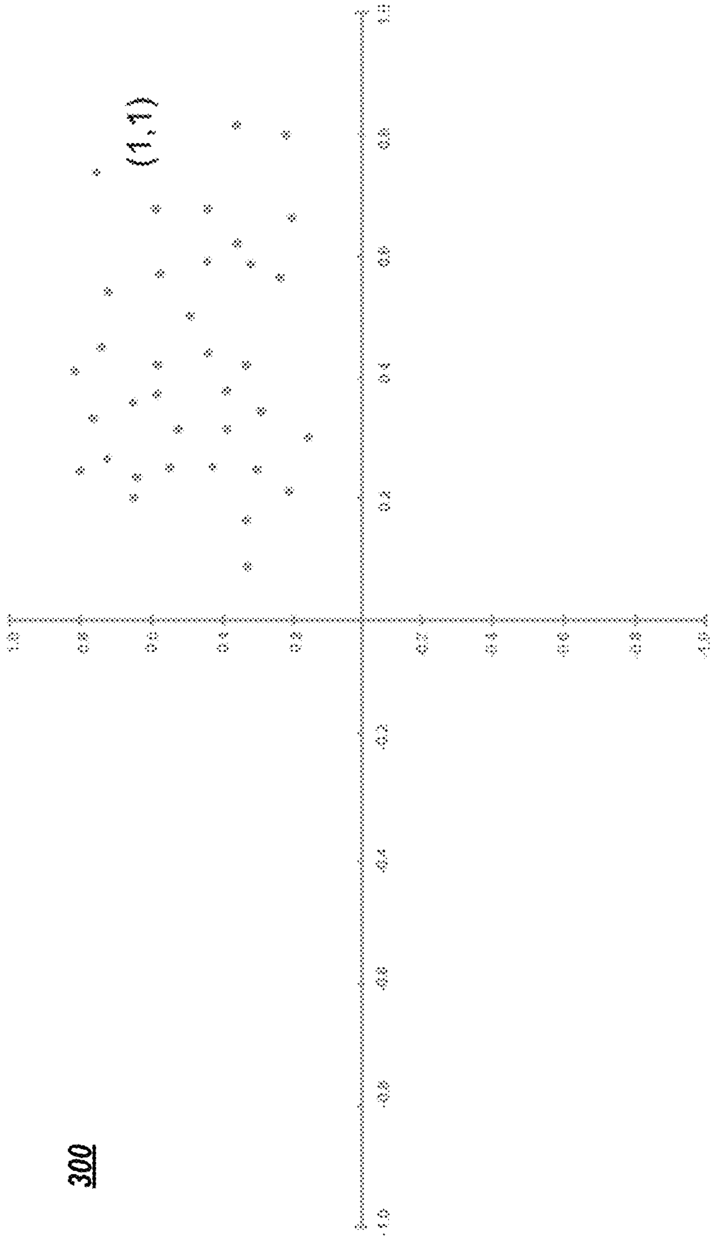
FIGS. 3A-3D depict example data characteristics.

In further detail, and with respect to data skew, in traditional binary quantization, a single, static threshold T is used across all dimensions (e.g., T=0), which gives rise to several issues. To illustrate these issues, a 2-dimensional vector can be considered, which is in over-simplified example (e.g., data embeddings can be have hundreds to thousands of dimensions). FIG. 3A depicts a graph 300 of a normalized value range of each dimension as (−1.0, 1.0). When a threshold of 0 is used for both dimensions, as is common in traditional approaches to binary quantization, all 2-dimensional embeddings can be converted into 4 possible values based on the quadrant each belongs to: (1,1), (0,1), (0,0), (1, 0). In FIG. 3A, it can be seen that the data is highly skewed. All data points are located in the first quadrant. Once binarized, each of the 2-dimensional vectors will be converted into {1, 1}, making it impossible to discern between most data embeddings. The binary quantization fails at this point.

To resolve this issue, the modified binary quantization of the present disclosure utilizes a unique threshold for each dimension, as represented in Equation 1, above. In some implementations, instead of using a midpoint of the domain range, the central value of the data points can be determined for accurate partitioning. To do this, a set of statistics is determined for values of each dimension across the data embeddings of the vector database 204. For example, the vector sampling module 206 can retrieve, for each dimension, dimension values from data embeddings stored within the vector database 204, and the statistics module 208 can determine the set of statistics for each dimension. In some examples, the set of statistics can be based on a random sampling of data embeddings from the vector database 204 (e.g., sample size of 1000).

In some examples, the set of statistics includes mean value, median value, and mid value. An initial threshold for the $i^{th}$ feature is determined as a center value per the following example relationship:

$$T_{INI,i} = (\text{mean}_i + \text{median}_i + \text{mid}_i)/3 \quad (2)$$

Figure 3B:
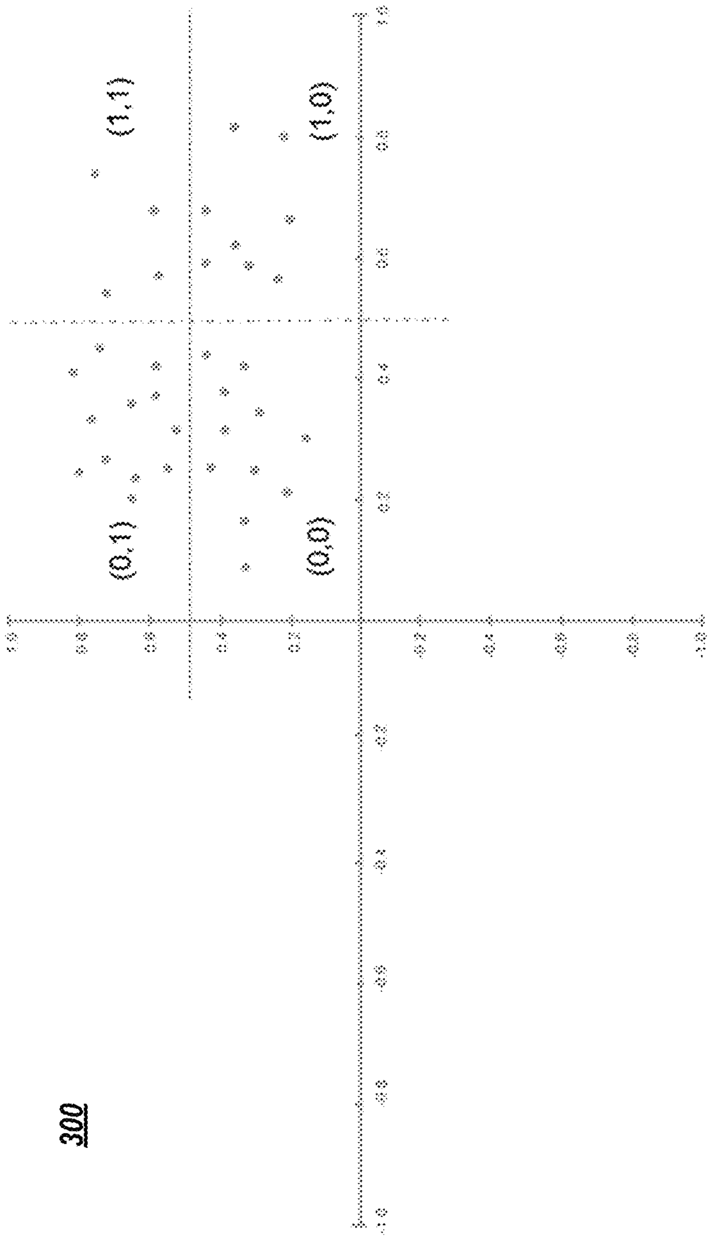

In some examples, the mid value is determined as a difference between a maximum value and a minimum value of the $i^{th}$ feature divided by two. FIG. 3B depicts the graph 300 of FIG. 3A annotated to illustrate the impact of applying the initial threshold showing that the skewed data can now be accurately classified.

Figure 3C:
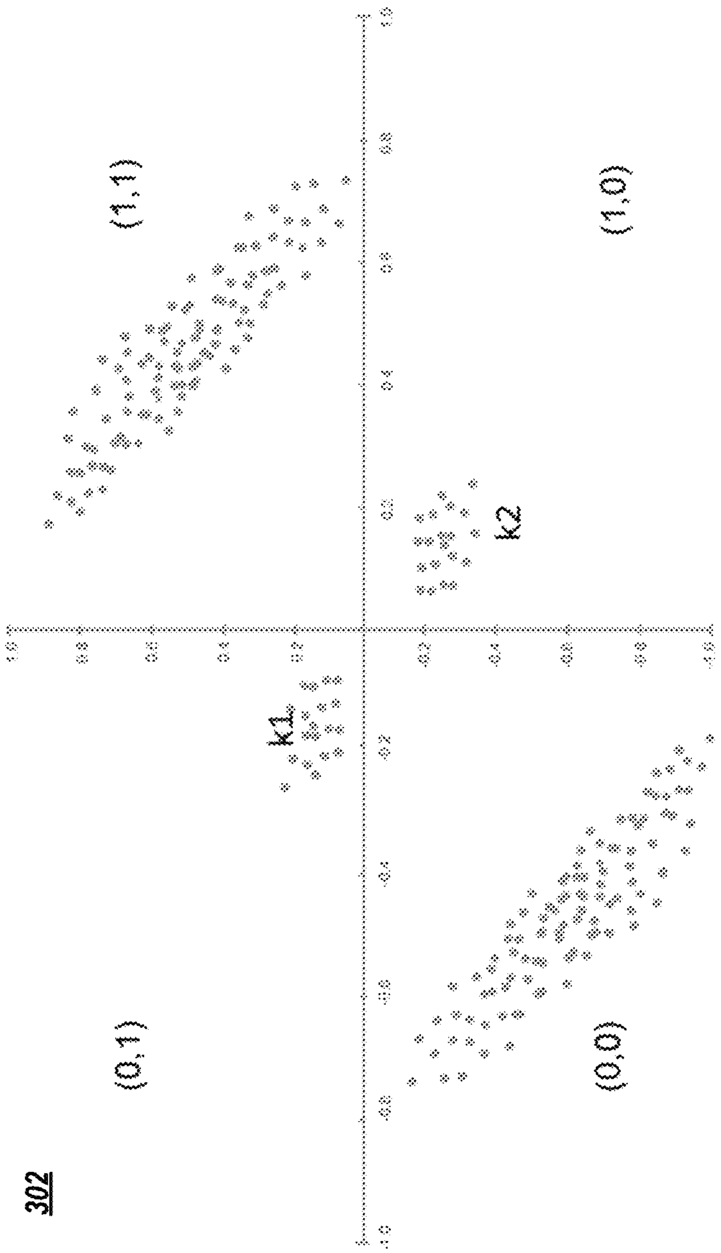

In further detail, and with respect to data symmetry, FIG. 3C depicts a graph 302 representative of another common distribution. The data points in clusters k1 and k2 are closely positioned in the floating point value embedding space. It might be expected that this proximity would remain after binarization. However, when the cluster k1 is converted into (0,1) and the cluster k2 is converted into (1,0) using binary quantization, the hamming distance between the cluster k1 and the cluster k2 becomes 2, which indicates a significant separation. Utilizing median or average as a threshold is not effective in this scenario, given the highly symmetrical nature of the data distribution.

Figure 3D:
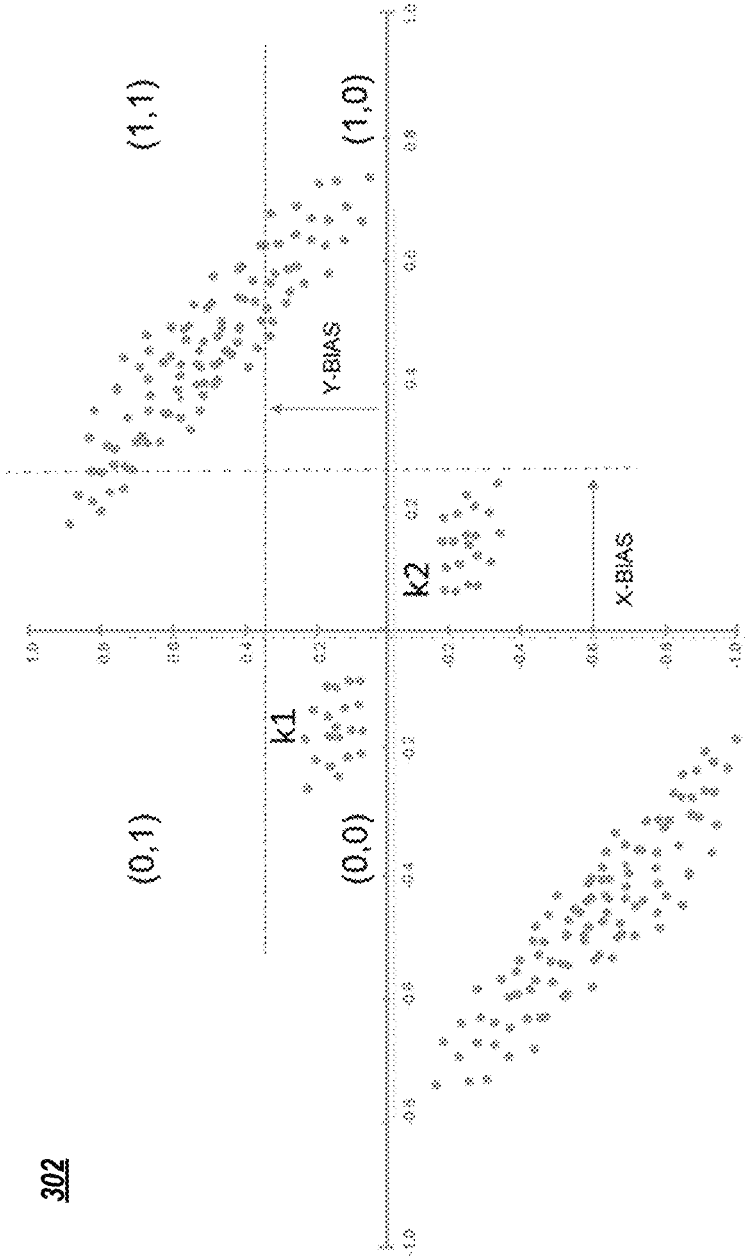

To address this issue, the modified binary quantization of the present disclosure adds a bias to the initial threshold to provide a threshold. In some examples, a portion of the value range is used as the bias, as represented in FIG. 3D. An example relationship is provided as:

$$\text{Bias}_i = b_i * \frac{(r\max_i - r\min_i)}{2} \quad (3)$$

where $0<b_i<1$, rmax is the upper bound of the domain (1.0 in the example of FIG. 3D), and rmin is the lower bound (−1.0 in the example of FIG. 3D). In some examples, the value of $b_i$ (e.g., 0.1) can be the same for all dimensions. In some examples, the value of $b_i$ can be empirically determined. In some examples, the value of $b_i$ can be determined using statistical analysis, such as relative average deviation (RAD) for each dimension calculated based on data samples. From FIG. 3D, it can be seen that the cluster k1 and the cluster k2 are grouped together in binary embeddings, which means that the cluster k1 and the cluster k2 are correctly near to each other in the binary embedding space.

In combining the initial threshold and the bias, the threshold for each feature can be represented as:

$$T_i = \frac{(\text{mean}_i + \text{median}_i + \text{mid}_i)}{3} \pm b_i * (r\max_i - r\min_i)/2 \quad (4)$$

In some examples, the threshold is determined by adding the bias. In some examples, the threshold is determined by subtracting the bias. Referring again to FIG. 2, the threshold generation module 210 determines a set of thresholds $\{T_1, \ldots, T_N\}$ across the features of the data embeddings using, for example, the relationship of Equation 4.

In accordance with implementations of the present disclosure, the binary index creation module 212 generates binary embeddings for each of the data embeddings stored in the vector database 204 using the set of thresholds $\{T_1, \ldots, T_N\}$ and stores the binary embeddings in the binary index 250 (e.g., Table 2). For example, each feature value $x_i$ is compared to a respective threshold $T_i$ to determine a binary value (e.g., 0, 1).

In some implementations, the query 230 is submitted and is received by the embedder 214. In some examples, the query 230, or at least a portion thereof, can be processed by the embedder 214 to provide a query embedding. For example, the query 230 can include source data (e.g., source text, a source document, a source chunk) that can be processed by the embedder 214 to provide the query embedding. In some examples, the query embedding is provided in the same embedding space that was used to generate the data embeddings that are stored in the vector database 204 (e.g., the embedder 202 and the embedder 214 are the same). Accordingly, the query embedding is an N-dimensional vector with each dimension having a floating point number assigned thereto.

In some implementations, the binary schema retrieval module 216 retrieves the set of thresholds $\{T_1, \ldots, T_N\}$ that were used to generate the binary embeddings from the data embeddings. In some implementations, the binary embedder 218 generates a query binary embedding using the query embedding and the set of thresholds $\{T_1, \ldots, T_N\}$. For example, each feature value $x_1$ of the query embedding is compared to a respective threshold $T_j$ to determine a binary value (e.g., 0, 1).

In accordance with implementations of the present disclosure, two-phase scoring is implemented to enhance vector search for data embeddings in the vector database 204. In a first phase, the binary index 250 is used to obtain an initial set of results using an over-fetching rate R (e.g., user-configurable), such that the initial set of results can represent more data embeddings than are to be used. In some examples, the R candidate search module 220 searches the vector database 204 using the query binary embedding and the binary embeddings stored in the vector database 204 to determine an initial set of R candidates (e.g., a set of R data embeddings).

For example, a distance (e.g., Hamming distance) is determined between the query binary embedding and each of the binary embeddings of the vector database 204 to provide a first set of similarity scores, each similarity score representing a degree of similarity between the query binary embedding and a respective binary embedding of the vector database 204. For example, each similarity score is provided as a Hamming distance between the query binary embedding and a respective binary embedding. In some examples, the similarity scores are put in rank order and the binary embeddings associated with the top R similarity scores are determined.

In a second phase, a set of k data embeddings is determined based on the set of R candidates. In some examples, the top k candidate search module 222 retrieves the data embeddings associated with the binary embeddings returned from the R candidate search and compares each to the query embedding to determine a set of k data embeddings. For example, a distance (e.g., cosine distance) is determined between the query embedding and each of the data embeddings returned from the R candidate search to provide a second set of similarity scores, each similarity score representing a degree of similarity between the query embedding and a respective data embedding. For example, each similarity score is provided as a cosine distance between the query embedding and a respective data embedding. In some examples, the similarity scores are put in rank order and the data embeddings associated with the top k similarity scores are determined. In some examples, the context data associated with the data embeddings in the set of k data embeddings is retrieved (e.g., based on respective URLs) and are provided to the prompt generation module 224.

In some implementations, the prompt generation module 224 generates a prompt that is used to prompt the LLM of the LLM system 226. In some examples, the prompt generation module 224 can generate the prompt using a prompt template. For example, the prompt template can include static text (e.g., same text for each prompt that is to be generated) and placeholders. In some examples, the static text defines the task that is to be performed by the LLM system 226 (e.g., provide a resolution to an application error described in the query), constrains the LLM system 226 (e.g., instructing the LLM that its response must be provided in JSON format), and other instructions for processing the prompt. In some examples, the prompt is generated by populating a placeholder with the query 230 and one or more placeholders with context data returned for the data embeddings (the top K data embeddings), which is collectively used as context for the LLM system 226 when processing the prompt.

Figure 4A:
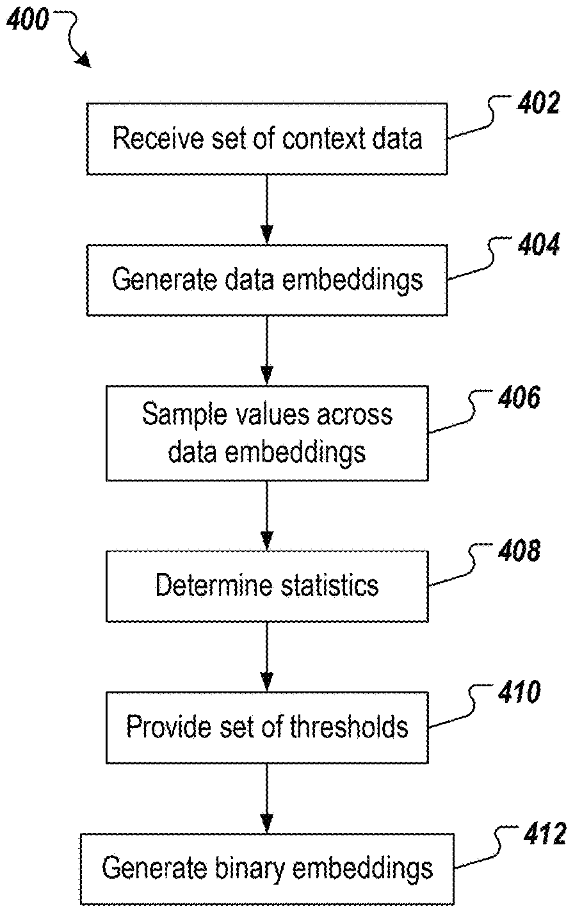
FIGS. 4A and 4B depict example processes that can be executed in accordance with implementations of the present disclosure.

FIG. 4A depicts an example process 400 that can be executed in accordance with implementations of the present disclosure. In some examples, the example process 400 is provided using one or more computer-executable programs executed by one or more computing devices.

A set of context data is received (402) and data embeddings are generated (404). For example, and as described herein with reference to FIG. 2, the set of context data 240 is received by the embedder 202. The set of context data 240 represents contextual information for a specific domain and one or more tasks that are relevant to the domain. Each context data in the set of context data 240 is processed by the embedder 202, which embeds the context data in an embedding space. For each context data in the set of context data 240, a data embedding (vector) is provided and is stored in the vector database 204.

Values are samples across data embeddings (406) and statistics are determined (408). For example, and as described herein, the vector sampling module 206 can retrieve, for each dimension, dimension values from data embeddings stored within the vector database 204, and the statistics module 208 can determine the set of statistics for each dimension. Example statistics can include, for each dimension, mean, median, mid, rmax, and rmin. A set of thresholds is provided (410) and binary embeddings are generated (412). For example, and as described herein, the threshold generation module 210 determines a set of thresholds $\{T_1, \ldots, T_N\}$ across the features of the data embeddings using, for example, the relationship of Equation 4. The binary index creation module 212 generates binary embeddings for each of the data embeddings stored in the vector database 204 using the set of thresholds $\{T_1, \ldots, T_N\}$ and stores the binary embeddings in the binary index 250 (e.g., Table 2). For example, each feature value $x_1$ is compared to a respective threshold $T_i$ to determine a binary value (e.g., 0, 1).

Figure 4B:
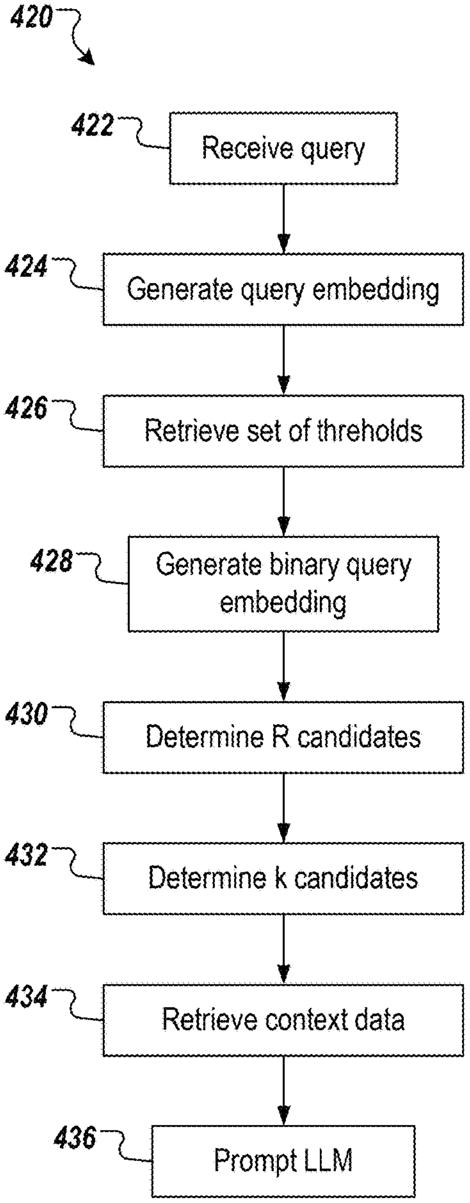

FIG. 4B depicts an example process 420 that can be executed in accordance with implementations of the present disclosure. In some examples, the example process 420 is provided using one or more computer-executable programs executed by one or more computing devices.

A query is received (422) and a query embedding is generated (424). For example, and as described herein with reference to FIG. 2, the query 230 is submitted and is received by the embedder 214. In some examples, the query 230, or at least a portion thereof, can be processed by the embedder 214 to provide a query embedding.

A set of thresholds is retrieved (426) and a binary query embedding is generated (428). For example, and as described herein, the binary schema retrieval module 216 retrieves the set of thresholds $\{T_1, \ldots, T_N\}$ that were used to generate the binary embeddings from the data embeddings. In some implementations, the binary embedder 218 generates a query binary embedding using the query embedding and the set of thresholds $\{T_1, \ldots, T_N\}$. For example, each feature value $x_1$ of the query embedding is compared to a respective threshold $T_j$ to determine a binary value (e.g., 0, 1).

A set of R candidates is determined (430). For example, and as described herein, the R candidate search module 220 searches the vector database 204 using the query binary embedding and the binary embeddings stored in the vector database 204 to determine an initial set of R candidates (e.g., a set of R data embeddings). For example, a first set of similarity scores is provided, each similarity score representing a degree of similarity between the query binary embedding and a respective binary embedding of the vector database 204. For example, each similarity score is provided as a Hamming distance between the query binary embedding and a respective binary embedding. In some examples, the similarity scores are put in rank order and the binary embeddings associated with the top R similarity scores are determined.

A set of k candidates is determined (432). For example, and as described herein, the top k candidate search module 222 retrieves the data embeddings associated with the binary embeddings returned from the R candidate search and compares each to the query embedding to determine a set of k data embeddings. For example, a second set of similarity scores is provided, each similarity score representing a degree of similarity between the query embedding and a respective data embedding. For example, each similarity score is provided as a cosine distance between the query embedding and a respective data embedding. In some examples, the similarity scores are put in rank order and the data embeddings associated with the top k similarity scores are determined.

Context data is retrieved (434) and a LLM is prompted (436). For example, and as described herein, the context data associated with the data embeddings in the set of k data embeddings is retrieved (e.g., based on respective URLs) and are provided to the prompt generation module 224. The prompt generation module 224 generates a prompt that is used to prompt the LLM of the LLM system 226.

Figure 5:
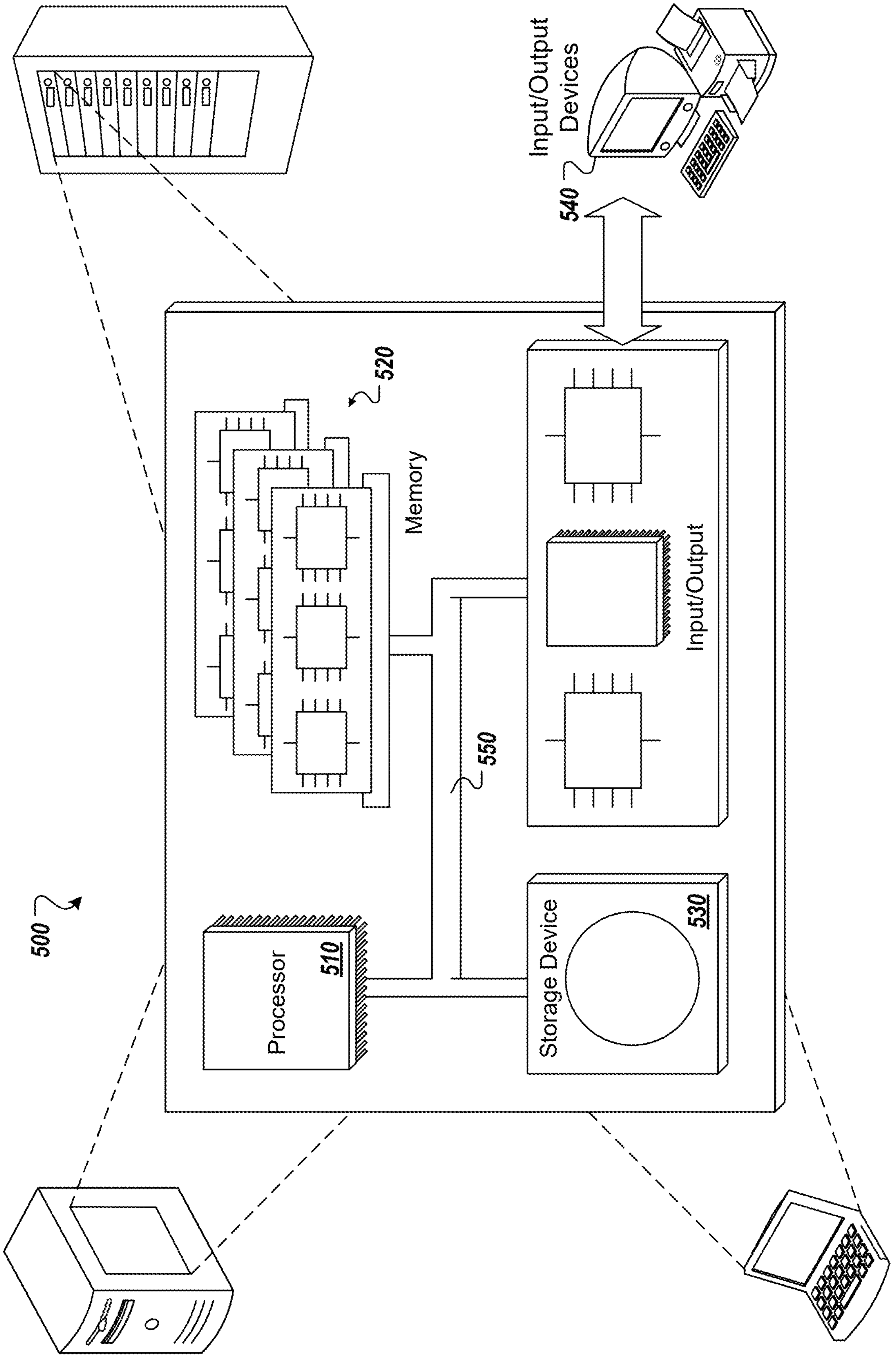
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for prompting to large language models (LLMs), the method being executed by one or more processors and comprising:
- generating a set of data embeddings from a set of context data, each data embedding comprising N-dimensions and representing context data in the set of context data within a first embedding space;
- determining, for each dimension of the N-dimensions, a set of statistics;
- providing a set of thresholds, each threshold in the set of thresholds corresponding to a dimension of the N-dimensions and being determined based on a respective set of statistics for the dimension;
- generating a set of binary embeddings through binary quantization of data embeddings in the set of data embeddings using the set of thresholds, each binary embedding comprising the N-dimensions and representing context data in the set of context data within a second embedding space;
- retrieving a sub-set of context data responsive to a query based on the set of binary embeddings; and
- prompting a LLM using a prompt comprising the sub-set of context data.

2. The method of claim 1, wherein each threshold in the set of thresholds comprises an initial threshold and a bias that are each specific to a respective dimension of the N-dimensions.

3. The method of claim 1, wherein the set of statistics comprises, for each dimension, a mean, a median, and a mid.

4. The method of claim 1, wherein retrieving a sub-set of context data responsive to a query based on the set of binary embeddings comprises:
- generating a query embedding representative of the query in the first embedding space;
- generating a query binary embedding representative of the query in the second embedding space using the set of thresholds;
- determining a set of candidate binary embeddings by comparing the query binary embedding to binary embeddings in the set of binary embeddings;
- retrieving a first sub-set of data embeddings from the vector database based on the set of candidate binary embeddings;
- determining a second sub-set of data embeddings by comparing the query embedding to data embeddings in the first sub-set of data embeddings; and
- retrieving context data corresponding to data embeddings in the second sub-set of data embeddings.

5. The method of claim 1, wherein the first embedding space comprises floating point values and the second embedding space comprises binary values.

6. The method of claim 1, each threshold in the set of thresholds is specific to a dimension of the N-dimensions.

7. The method of claim 1, wherein the set of statistics is determined based on normalizing values of a respective dimension of the N-dimensions.

8. A non-transitory computer-readable storage medium coupled to one or more processors and having instructions stored thereon which, when executed by the one or more processors, cause the one or more processors to perform operations for prompting to large language models (LLMs), the operations comprising:
- generating a set of data embeddings from a set of context data, each data embedding comprising N-dimensions and representing context data in the set of context data within a first embedding space;
- determining, for each dimension of the N-dimensions, a set of statistics;
- providing a set of thresholds, each threshold in the set of thresholds corresponding to a dimension of the N-dimensions and being determined based on a respective set of statistics for the dimension;
- generating a set of binary embeddings through binary quantization of data embeddings in the set of data embeddings using the set of thresholds, each binary embedding comprising the N-dimensions and representing context data in the set of context data within a second embedding space;
- retrieving a sub-set of context data responsive to a query based on the set of binary embeddings; and
- prompting a LLM using a prompt comprising the sub-set of context data.

9. The non-transitory computer-readable storage medium of claim 8, wherein each threshold in the set of thresholds comprises an initial threshold and a bias that are each specific to a respective dimension of the N-dimensions.

10. The non-transitory computer-readable storage medium of claim 8, wherein the set of statistics comprises, for each dimension, a mean, a median, and a mid.

11. The non-transitory computer-readable storage medium of claim 8, wherein retrieving a sub-set of context data responsive to a query based on the set of binary embeddings comprises:
- generating a query embedding representative of the query in the first embedding space;
- generating a query binary embedding representative of the query in the second embedding space using the set of thresholds;
- determining a set of candidate binary embeddings by comparing the query binary embedding to binary embeddings in the set of binary embeddings;
- retrieving a first sub-set of data embeddings from the vector database based on the set of candidate binary embeddings;
- determining a second sub-set of data embeddings by comparing the query embedding to data embeddings in the first sub-set of data embeddings; and
- retrieving context data corresponding to data embeddings in the second sub-set of data embeddings.

12. The non-transitory computer-readable storage medium of claim 8, wherein the first embedding space comprises floating point values and the second embedding space comprises binary values.

13. The non-transitory computer-readable storage medium of claim 8, each threshold in the set of thresholds is specific to a dimension of the N-dimensions.

14. The non-transitory computer-readable storage medium of claim 8, wherein the set of statistics are determined based on normalizing values of a respective dimension of the N-dimensions.

15. A system, comprising:

a computing device; and a computer-readable storage device coupled to the computing device and having instructions stored thereon which, when executed by the computing device, cause the computing device to perform operations for prompting to large language models (LLMs), the operations comprising:

generating a set of data embeddings from a set of context data, each data embedding comprising N-dimensions and representing context data in the set of context data within a first embedding space;

determining, for each dimension of the N-dimensions, a set of statistics;

providing a set of thresholds, each threshold in the set of thresholds corresponding to a dimension of the N-dimensions and being determined based on a respective set of statistics for the dimension;

generating a set of binary embeddings through binary quantization of data embeddings in the set of data embeddings using the set of thresholds, each binary embedding comprising the N-dimensions and representing context data in the set of context data within a second embedding space;

retrieving a sub-set of context data responsive to a query based on the set of binary embeddings; and prompting a LLM using a prompt comprising the sub-set of context data.

16. The system of claim 15, wherein each threshold in the set of thresholds comprises an initial threshold and a bias that are each specific to a respective dimension of the N-dimensions.

17. The system of claim 15, wherein the set of statistics comprises, for each dimension, a mean, a median, and a mid.

18. The system of claim 15, wherein retrieving a sub-set of context data responsive to a query based on the set of binary embeddings comprises:

generating a query embedding representative of the query in the first embedding space;

generating a query binary embedding representative of the query in the second embedding space using the set of thresholds;

determining a set of candidate binary embeddings by comparing the query binary embedding to binary embeddings in the set of binary embeddings;

retrieving a first sub-set of data embeddings from the vector database based on the set of candidate binary embeddings;

determining a second sub-set of data embeddings by comparing the query embedding to data embeddings in the first sub-set of data embeddings; and retrieving context data corresponding to data embeddings in the second sub-set of data embeddings.

19. The system of claim 15, wherein the first embedding space comprises floating point values and the second embedding space comprises binary values.

20. The system of claim 15, each threshold in the set of thresholds is specific to a dimension of the N-dimensions.

* * * * *